UNITED STATES PATENT OFFICE.

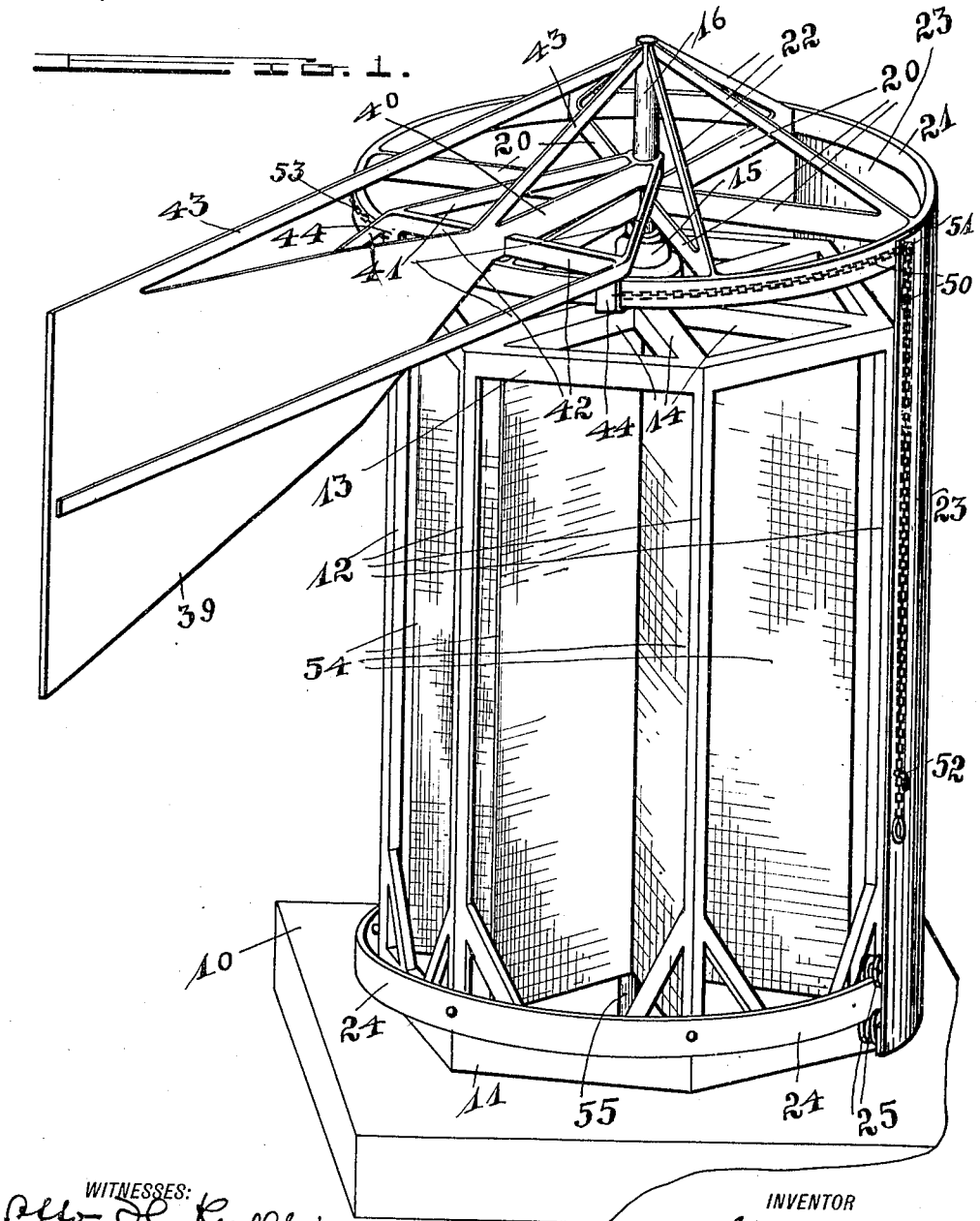

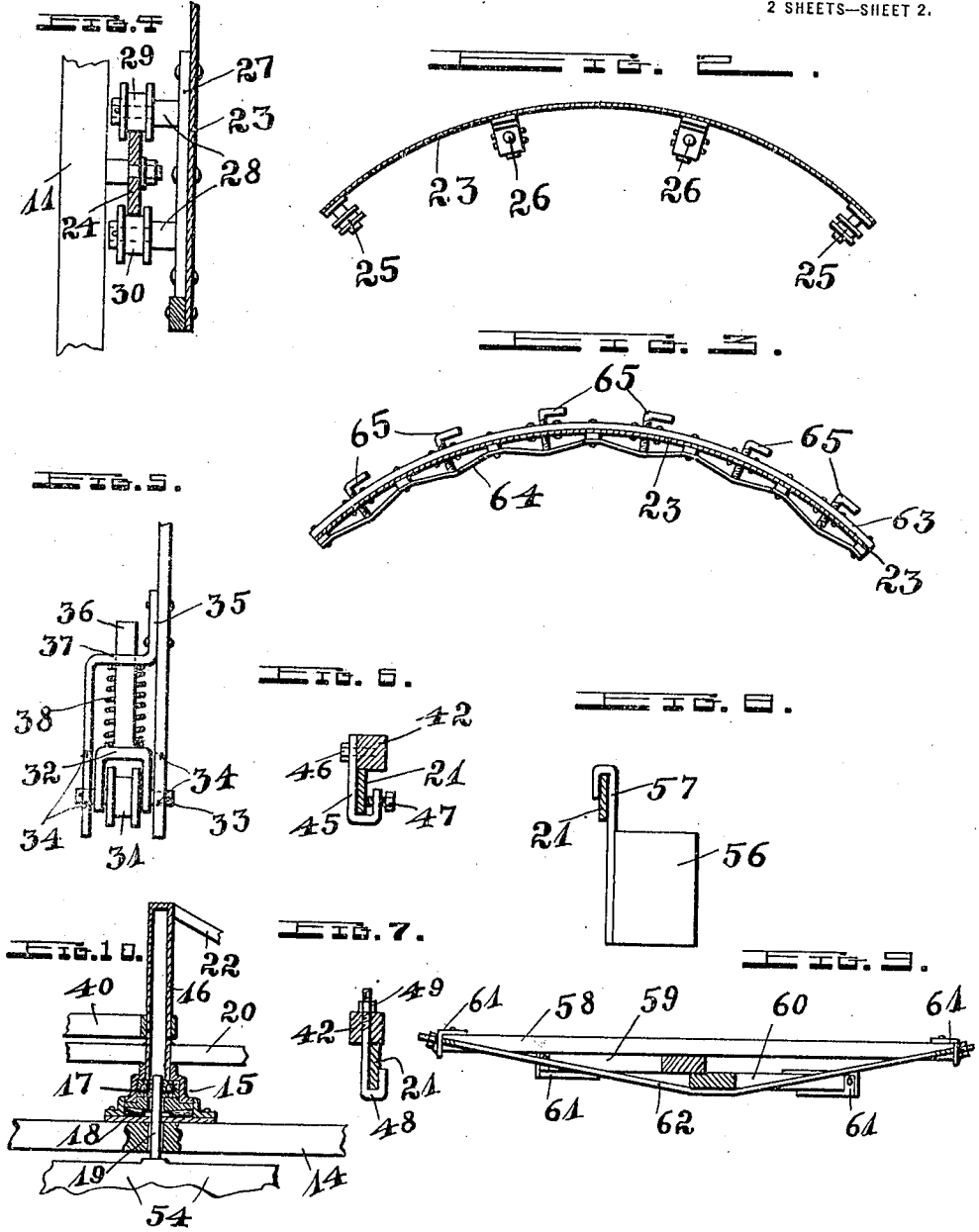

JOHN P. MULLER, OF SAN FERNANDO, CALIFORNIA.

WINDMILL.

1,298,247.   Specification of Letters Patent.   Patented Mar. 25, 1919.

Application filed July 10, 1918.  Serial No. 244,186.

*To all whom it may concern:*

Be it known that I, JOHN P. MULLER, a citizen of the United States, residing at San Fernando, in the county of Los Angeles and State of California, have invented certain new and useful Improvements in Windmills, of which the following is a specification.

This invention relates to wind mills in which the power or wind wheel is partially incased and arranged to revolve in a practically horizontal plane.

One object of the invention is to provide simple and efficient means for setting the tail vane in suitable relation to the casing or wind shield for covering a suitable part of the wheel by the shield, so as to expose only a part or nothing at all of the wind wheel to the wind, or to the action of the wind.

Another object is to provide suitable means for easily and automatically turning the wind shield and tail vane.

Another object is to provide suitable balancing means between the wind shield and the tail vane.

Another object is to provide suitable supporting means for the wind shield at its lower end for evenly and easily turningly supporting the shield.

Another object is to provide a suitable frame with a suitably reinforced top for supporting the whole frame work and connecting rods for their turning movement.

Another object is to provide suitable reinforcing bars for the wind shield for holding and keeping the wind shield in its shape.

Another object is to provide means for adjusting the arch- or circular shape of the wind shield against the flattening influences of the wind.

Other objects will appear from the following description and appended claims as well as from the accompanying drawing, in which—

Figure 1 is a perspective view of the complete wind mill.

Fig. 2 is a horizontal section through the wind shield showing the supporting rollers attached to the lower end of the shield.

Fig. 3 is a horizontal section through the wind shield showing the adjusting means for holding and readjusting the circular shape of the wind shield.

Fig. 4 is a side elevation of a set of supporting rollers in enlarged detail.

Fig. 5 is a detail side elevation of the middle supporting rollers.

Fig. 6 is a detail side elevation of the connecting means between tail vane and the wind shield.

Fig. 7 is a detail side elevation of the connecting means between the tail vane and the wind shield, slightly modified.

Fig. 8 is a detail side elevation of the balancing weight to be hung over the ring, to which the wind shield is connected at its upper end and upon which the tail vane rests movably.

Fig. 9 is a slight modification of the supporting spider by which the wind shield and tail vane are supported.

Fig. 10 is a fragmentary vertical sectional view of the central support of the turning frame on the stationary frame.

In Fig. 1, 10 designates the base made of concrete, brick, wood, or any other suitable material. The main frame 11 is mounted on the base, supporting the posts 12. The frame 13 connects the upper free ends of the posts 12. A spider frame 14 is disposed within the upper frame 13 for holding and supporting the center bearing 15. The bearing 15 with the hollow standard 16 is shown in detail in Fig. 10, mounted on the spider frame 14 inclosing a vertical ball-bearing 17 and a horizontal roller-bearing 18, the ball-bearing forming the centralizing guide for the fan shaft 19, and the roller-bearing 18 supporting the hollow standard with the rotating frame work. The rotating frame work consists of the hollow standard 16, the ribs 20, the ring 21 and the braces 22, the whole being turnable above the main frame with the supporting posts 12 and the upper frame 13. To the ring 21 is the upper end of the wind shield 23 securely connected hanging downwardly to the base 10, from which the shield is suitably spaced to freely turn with the turning frame work above the base. A track ring 24 is suitably secured to the lower end of the main frame 11 spaced from the base, forming the guiding and supporting means for the lower end of the wind shield. The lower end of the wind shield is for such guiding and supporting purpose provided with a suitable number of rollers. In Fig. 2 is a preferred arrangement for the supporting rollers near the lower end of the wind shield, one double-roller near each lower corner of the wind shield indicated at 25, and two or any other number of spring-actuated rollers at suitable places between the two double rollers indicated at 26. The double rollers are shown in detail in Fig. 4, consisting of the bar 27, the pins 28, and the rollers 29 and 30, the roller 29 being above the track ring 24 and the roller 30 below the track ring, preventing the disengaging of the rollers and therewith of the wind shield from the track ring.

A blowing or pressing of the wind against the wind shield naturally causes leaning or bending of the upper end of the mill however slight it may be, but very often it would be enough to procure a very hard friction against the track ring by the rollers if double rollers would also be used in the middle part of the wind shield in an upwardly direction causing at the same time a similar friction in the end rollers 25, see Fig. 2, in a downwardly direction. To eliminate such unnecessary friction, I prefer to use the double rollers only at the ends as indicated, while the spring-actuated rollers are used in the middle, allowing a giving of the shield in the middle while still kept and held on the track ring by the spring-actuation of such rollers.

In Fig. 5 is a detail illustration of a spring-actuated roller; the roller 31 being turnably mounted within the yoke 32; the pin 33, holding the roller 31 turnably within the yoke 32, being of suitable length to project through the slots 34 in the frame 35; an upwardly projecting stem 36 being disposed through a hole 37 in the frame 35; and a spring 38 being disposed within the frame 35 resting upon the yoke 32; allowing the roller to slidingly move within the frame 35, the frame always resting on the roller through the spring 38, disposed between the frame and the roller-yoke.

The tail vane 39, see Fig. 1, is swingably engaged with the hollow standard 16 by the connecting arm 40, and, to keep the tail vane in radial relation to the mill, the braces 41 and the cross bar 42 are provided. The supporting braces 43 are provided to hold the tail vane horizontally in position. Clamping members 44 are provided at suitable points on the braces 41 or on the cross bar 42 for securely holding the tail vane at certain desired positions in relation to the wind shield on the ring 21. Such clamping members are illustrated in Figs. 6 and 7. In Fig. 6, a U-bar 45 is rigidly secured to the cross bar 42 by the bolts 46, and set screws 47 are provided for securely holding the clamping member to the ring 21. The slightly modified form illustrated in Fig. 7 shows a U-bolt 48 disposed through a hole in the cross bar 42, a nut 49 being provided for clamping the ring 21 to the cross bar 42.

Under changing weather or changing wind, it is preferable not to clamp the tail vane rigidly to the ring 21 as has been described above, but to loosen the clamping members enough to allow a swinging around the standard 16 slidingly on the ring 21, and to provide means for setting the tail vane in different suitable positions relative to the wind shield from a suitable point below while the mill is running whenever the changing wind requires so. A chain or any other suitable flexible means 50 is therefore secured to one of the clamping members running over a roller or pulley 51 downwardly, engaging over a hook 52, at a suitable point to be reached from below; another chain 53 being connected to another clamping member on the opposite side of the tail vane for holding the tail vane in the opposite direction, see Fig. 1. By such chains the tail vane can easily be set on the ring in different positions in relation to the wind shield, as will easily be understood.

The fan, having a suitable number of vanes 54 is turnably mounted within the main frame 11 between the posts 12 turning in a horizontal plane, the upper end 19 of the shaft being journaled in the ball bearing 17 shown in Fig. 10, while the lower end 55 projects downwardly through the base 10 to a suitable place to which the power is to be transmitted.

To balance the tail vane 39 and the wind shield 23 properly on the ring, a weight 56, illustrated in Fig. 8, is provided, having a hook 57 to be engaged over the ring 21 at a suitable point.

The spider frame 14 has to be rather strong since it practically supports the whole tail vane and wind shield. A modified form of construction of this spider is illustrated in Fig. 9, there being three heavy bars 58, 59 and 60, crossing one another so as to bring the six ends equally far apart. Each end of these bars is provided with a plate 61 through which the bracing rods 62 are disposed, each rod passing under the lowermost bar thereby bracing the whole construction and holding it together.

In Fig. 3 is a horizontal section through the wind shield 23, having a bar 63 secured to the outside, and another bar 64 secured to the inside spaced from the wind shield. By having the threaded stems 65 screwed through the bar 63 and through the wind shield against the bar 64, the arch or circular shape of the wind shield can easily be adjusted to a different curve and circle as will easily be understood. This is especially of advantage in this kind of wind mills since the rather large wind shields in such mills are easily flattened by the pressure of the wind. Such construction serves also to keep the shield on the track ring, while flattened wind shields are liable to jump off.

Having thus described my invention, I claim:

1. In a wind mill of the class described, a main frame, a concentric bearing provided at the top end of the main frame, a track ring provided on the outside near the base of the main frame encircling the main frame in a practically horizontal plane, a wind shield of the size to incase a segment of the main frame from the base to the top end, a rotating frame mounted on the top bearing of the main frame for rotating movement in a practically horizontal plane, the wind shield being secured to the rotating frame at its upper edge hanging with its free end downwardly practically perpendicularly, one double roller provided on each corner at the lower end of the wind shield, and a suitable number of spring-actuated rollers provided at suitable places between the double rollers near the lower edge of the wind shield, all rollers in a position to engage with the track ring on the main frame.

2. In a wind mill of the class described, a main frame, a concentric bearing provided at the top end of the main frame, a track ring provided on the outside near the base of the main frame encircling the main frame in a practically horizontal plane, a rotating frame mounted on the top bearing of the main frame for rotating movement in a practically horizontal plane, a wind shield of the size to incase the segment of the main frame from near the base to near the top end being with its upper end secured to the rotating frame so as to hang downwardly with its free end practically perpendicular, two double rollers provided at suitable places near the lower free end of the wind shield for holding the wind shield in suitable relation to the main frame so as to allow no other movement but the swinging movement around the vertical axis of the main frame, a suitable number of spring-actuated rollers provided near the lower free edge of the wind shield, all rollers in a position to engage with the track ring, and adjusting means provided on the wind shield for maintaining the circular shape of the wind shield so as to allow an even engagement with the track ring, all substantially as described.

In testimony whereof I hereunto affix my signature in the presence of two witnesses.

JOHN P. MULLER.

Witnesses:
 OTTO H. KRUEGER,
 PHEBE A. PARKER.

Copies of this patent may be obtained for five cents each, by addressing the "Commissioner of Patents, Washington, D. C."